United States Patent [19]

Bogardus et al.

[11] 4,223,318

[45] Sep. 16, 1980

[54] METHOD AND APPARATUS FOR COMPENSATING FOR INSTABILITY OF A STREAM OF DROPLETS

[75] Inventors: E. Hal Bogardus, Poughkeepsie; Walter W. Hildenbrand, Brewster; Menachem Levanoni, Yorktown Heights, all of N.Y.

[73] Assignee: International Business Machines Corporation, Armonk, N.Y.

[21] Appl. No.: 858,980

[22] Filed: Dec. 9, 1977

[51] Int. Cl.² .............................................. G01D 15/18

[52] U.S. Cl. ................................ 346/1.1; 250/396 R; 250/398; 346/75

[58] Field of Search ................. 346/75, 1; 250/396 R, 250/492 R, 398; 313/444; 118/640, 623, 621, 624, 625, 627, 628; 239/15, 3; 400/126

[56] References Cited

U.S. PATENT DOCUMENTS

| | | | |
|---|---|---|---|
| 2,533,790 | 12/1950 | Grivet | 250/396 |
| 2,600,129 | 6/1952 | Richards | 346/75 X |
| 2,869,510 | 1/1959 | Renner | 118/627 X |
| 3,278,940 | 10/1966 | Ascoli | 346/75 |
| 3,500,436 | 3/1970 | Nordin | 346/75 |
| 3,579,245 | 5/1971 | Berry | 346/75 X |
| 3,877,036 | 4/1975 | Loeffler | 346/75 |
| 3,938,163 | 2/1976 | Fujimoto | 346/75 |

FOREIGN PATENT DOCUMENTS 853700 11/1960 United Kingdom .

OTHER PUBLICATIONS

Grivet, P., Electron Optics, Pergamon Press Ltd., 1965, FIG. 1 and pp. 48–60.

Harting et al., Electrostatic Lenses, Elsevier Scientific Publishing Co., 1976, pp. 1–3, 6–8, 82 and 175.

*Primary Examiner*—Joseph W. Hartary

*Attorney, Agent, or Firm*—Frank C. Leach, Jr.

[57] ABSTRACT

An electrostatic lens is disposed between a charge electrode and deflection plates to electrostatically focus each of the droplets on a recording surface at a position in alignment with the nozzle supplying the stream. The lens preferably comprises three electrodes with each of the outer electrodes having the same potential, which is substantially equal to the kinetic energy per unit charge of each of the charged droplets and of opposite polarity to the charge on the droplets, and the third electrode preferably being grounded. Each of the electrodes has a circular aperture through which the charged droplets pass with the electrodes being spaced from each other in the direction of the stream a distance preferably no greater than the diameter of the aperture. If desired, the electrode, which is furthest from the nozzle, can be omitted although this will produce some deceleration of the droplets.

18 Claims, 3 Drawing Figures

METHOD AND APPARATUS FOR COMPENSATING FOR INSTABILITY OF A STREAM OF DROPLETS

In an ink jet printing system, any stream of droplets fails to remain aligned between the nozzle and the position on the recording surface with which the nozzle is aligned as time progresses. It is not known what causes this instability of the ink jet stream, but it does increase as time progresses.

While the amount of wandering of the stream of droplets from its desired path, which is between the nozzle and the position on the recording surface aligned with the nozzle, is limited to a few milliradians, this slight difference can have a significant effect on print quality because the stream of droplets will not strike the recording surface at the desired position. Thus, with an ink jet printing apparatus being operated for a substantial period of time before being shut down, the stream can wander through the maximum of the few milliradians during operation.

The present invention satisfactorily solves the foregoing problem through substantially limiting the wandering of the ink stream from its desired path. The present invention contemplates electrostatically focusing each of the charged droplets of the stream at substantially the position on the recording surface in alignment with the nozzle from which the stream is supplied. Electrostatic focusing of each of the charged droplets is preferably accomplished without any change in the velocity of each of the charged droplets.

The present invention preferably employs an electrostatic lens having three electrodes spaced the same direction from each other in the direction in which the stream of droplets is moving. The spacing of the electrodes is preferably less than the diameter of the circular aperture of each of the electrodes through which the droplets pass.

In order to obtain electrostatic focusing of the charged droplets, the potential applied to each of the outer electrodes must be substantially the same as the kinetic energy per unit charge of the charged droplets. This potential must not exceed the kinetic energy per unit charge by even an order of magnitude.

In "Electron Optics" by P. Grivet, copyrighted 1965 by Pergamon Press Ltd., the concept of electrostatic focusing of electrons is discussed. This discusses using three electrodes with each of the outer electrodes having the same potential. Since the electrostatic lens is employed with an electron gun, each of the electrons will have the same kinetic energy and the same charge. While they will be subjected to a potential equal to the same kinetic energy per unit charge of each of the electrons, there is no discussion or recognition in "Electron Optics" of this. "Electron Optics" recognizes that the trajectory of the charged particles is independent of the charge or mass.

Furthermore, an ink jet droplet has a mass of about twenty orders of magnitude greater than the mass of an electron. There is no recognition in "Electron Optics" that a particle of such a relatively heavy mass in comparison with an electron could be electrostatically focused.

In "Electrostatic Lenses" by E. Harting and F. H. Read, copyrighted 1976 by Elsevier Scientific Publishing Company, the relationship of the distances between the image and the object for electrons and ions for two aperture lens and three aperture lens are disclosed in charts in which the ratio of the potentials applied to the electrodes of the two aperture lens and of the three aperture lens are set forth for various ratios of the potentials. If the nozzle is deemed to be the object and the recording surface the image, then the charts of "Electrostatic Lenses" can be employed to determine the approximate location of the nozzle from the electrostatic lens and the recording surface from the electrostatic lens with a specific potential ratio between the potential applied to each of the outer electrodes and the potential applied to the central electrode or the potential applied to each of the two electrodes when the electrostatic lens comprises the two aperture lens.

With the present invention, it is necessary for the potential applied to the outer electrodes of the three electrode lens to be of opposite charge to the charge on the droplet. As previously mentioned, this potential also must be substantially the same as the kinetic energy per unit charge of the charged droplets.

An object of this invention is to compensate for instability of a stream of charged droplets.

Another object of this invention is to compensate for instability of an ink stream of charged droplets.

A further object of this invention is to electrostatically focus charged droplets of a stream.

The foregoing and other objects, features, and advantages of the invention will be apparent from the following more particular description of a preferred embodiment of the invention as illustrated in the accompanying drawings.

Figure 1:
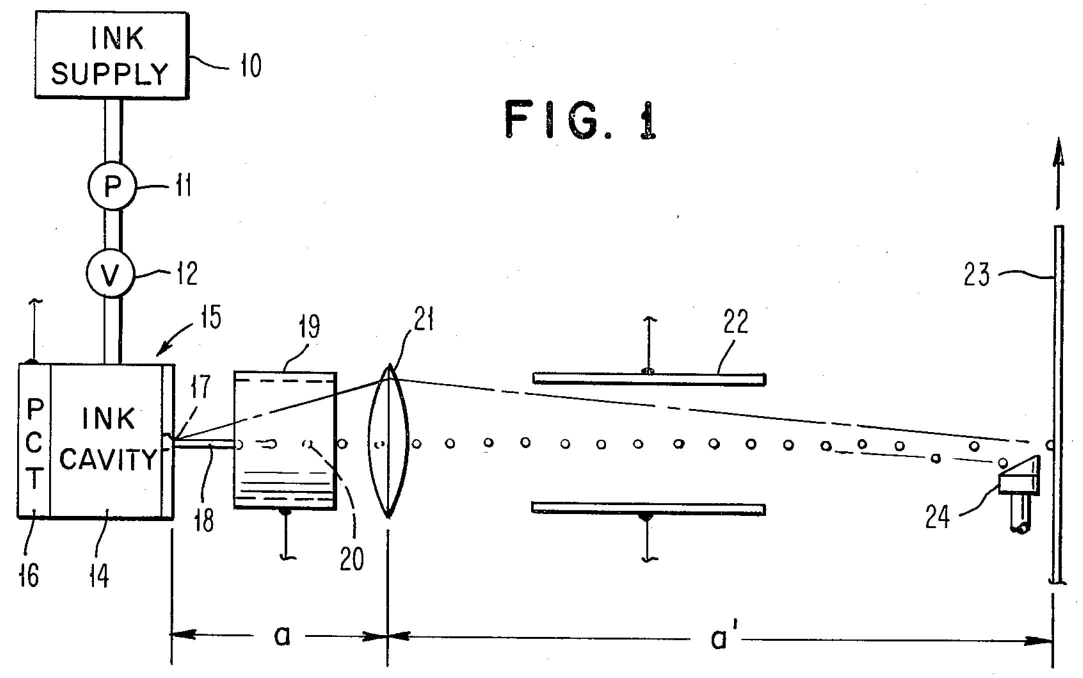
FIG. 1 is a schematic diagram of an ink jet printing apparatus using the focusing compensation of the present invention.

Referring to the drawings and particularly FIG. 1, there is shown a reservoir 10 of ink supplied to a pump 11. The ink is supplied under pressure from the pump 11 through a valve 12, which is used to start and stop the flow of ink from the pump 11, to an ink cavity 14 in an ink jet head 15. The ink jet head 15 includes a piezoelectric crystal transducer 16, which applies a predetermined frequency to the pressurized ink within the ink cavity 14.

The pressure of the ink supplied from the pump 11 determines the velocity at which the ink stream flows from the ink jet head 15 through a nozzle 17 (one shown). It should be understood that the ink jet head 15 may have a plurality of the nozzles 17.

An ink jet stream 18 flows from the nozzle 17 through a charge electrode 19. The stream 18 breaks up into droplets 20 at a predetermined break-off point, which is within the charge electrode 19. Thus, each of the droplets 20 can be charged to a desired magnitude or have no charge.

Each of the droplets 20 passes through an electrostatic lens 21 prior to passing through a pair of deflection plates 22. Each of the charged droplets 20 is deflected by the deflection plates 22 to strike a desired position on a recording surface 23 such as paper, for example. A gutter 24 receives any of the droplets 20 which are not to strike the recording surface 23.

The electrostatic lens 21 is employed to cause each of the charged droplets 20 to be electrostatically focused so that it will strike a selected position on the recording surface 23. This selected position is preferably aligned with the nozzle 17 if there is no deflection of the charged droplet 20 by the deflection plates 22 due to the deflection plates 22 being de-energized.

Figure 2:
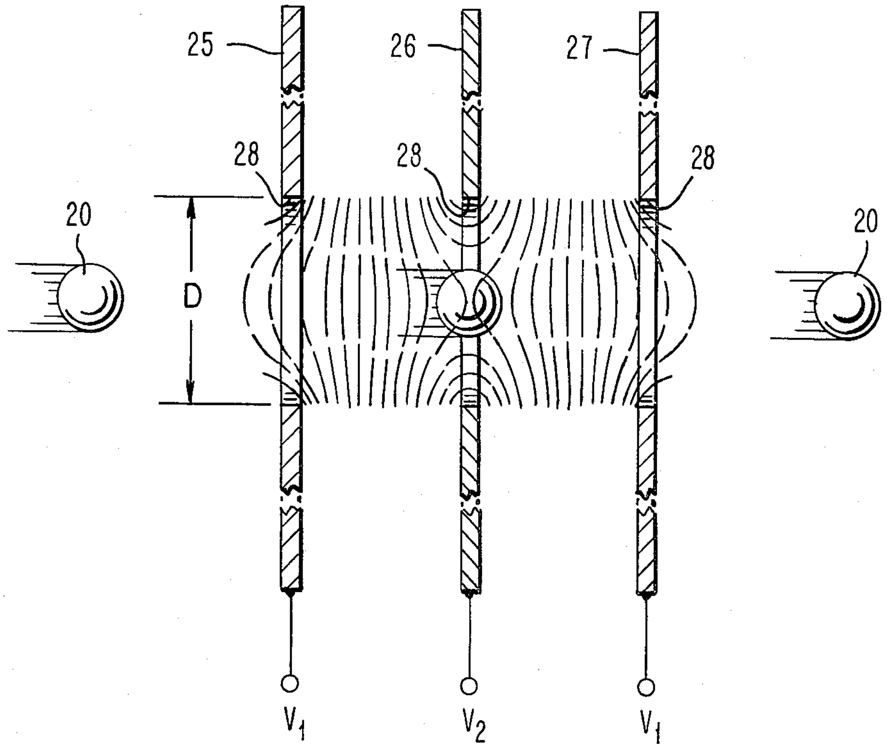
FIG. 2 is a schematic sectional view of the three electrode lens used with the apparatus of FIG. 1 and showing the electric fields therebetween.

The electrostatic lens 21 preferably electrostatically focuses the charged droplets 20 without any resultant change in the velocity of the charged droplets 20. Accordingly, the electrostatic lens 21 preferably includes three aperture electrodes 25, 26, and 27. The electrode 26 is a central electrode disposed between the outer electrodes 25 and 27 as shown in FIG. 2.

Each of the electrodes 25–27 has an aperture 28 therein of the same size or substantially the same size. Each of the apertures 28 is preferably circular.

The spacing between each adjacent pair of the three electrodes 25–27 in the direction in which the droplets 20 travel from the nozzle 17 to the recording surface 23 is preferably between 0.5D and D where D is the diameter of the aperture 28 of each of the electrodes 25–27. Each of the electrodes 25–27 preferably has a thickness of 0.05D.

The central electrode 26 of the electrostatic lens 21 is spaced a distance a from the nozzle 17 and a distance a' from the recording surface 23. The distances a and a' are selected so that a voltage $V_1$, which is applied to each of the electrodes 25 and 27, is substantially higher than a voltage $V_2$, which is applied to the electrode 26. The ratio of $V_2$ to $V_1$ is preferably zero so that the electrode 26 can be grounded as $V_2$ can be zero, but the ratio can be in a range from less than +1 to less than −1. When the electrode 26 is grounded, only one power supply is needed.

If the charged droplets 20 have a negative charge thereon, then $V_1$ is a relatively high positive potential. If the charged droplets 20 have a positive charge thereon, then $V_1$ is a relatively large negative voltage. Thus, $V_1$ could be 3,000 volts or −3,000 volts depending on the charge of the droplets 20.

The difference in potential between the electrodes 25 and 26 produces a first electric field gradient. The potential difference between the electrodes 26 and 27 produces a second electric field gradient, which is opposite to the first electric field gradient between the electrodes 25 and 26. Each of these electric field gradients produces a radial force on each of the charged droplets 20 to electrostatically focus the charged droplet 20. The fields producing these gradients are shown in FIG. 2.

The magnitude of $V_1$ is equal to the kinetic energy per unit charge of each of the charged droplets 20 when the charged droplet 20 is not to be deflected from striking a predetermined position on the recording surface 23. If the charged droplet 20 has a charge of a different magnitude thereon in order to be deflected to strike a different desired position on the recording surface 23 than the predetermined position, then the magnitude of $V_1$ is not equal to the kinetic energy per unit charge of the charged droplet 20 but is substantially equal thereto. That is, if the magnitude of the charge on the charged droplet 20 when it is to not be deflected from striking the predetermined position on the recording surface 23 is $10^{-12}$ coulomb, for example, then the magnitude of the charge on one of the droplets 20 for maximum deflection by the deflection plates 22 would be $0.5\times10^{-11}$ coulomb, for example. Thus, there is less than an order of magnitude difference between the charges.

Therefore, the magnitude of $V_1$ is at least substantially equal to the kinetic energy per unit charge of the charged droplet 20 and is equal to the kinetic energy per unit charge of the charged droplet 20 when the charged droplet 20 is not to be deflected from striking the predetermined position on the recording surface 23. Thus, the magnitude of $V_1$ is selected in accordance with the kinetic energy per unit charge of the charged droplet 20 that is not to have any deflection from striking the predetermined position on the recording surface 23 when passing through the deflection plates 22.

Figure 3:
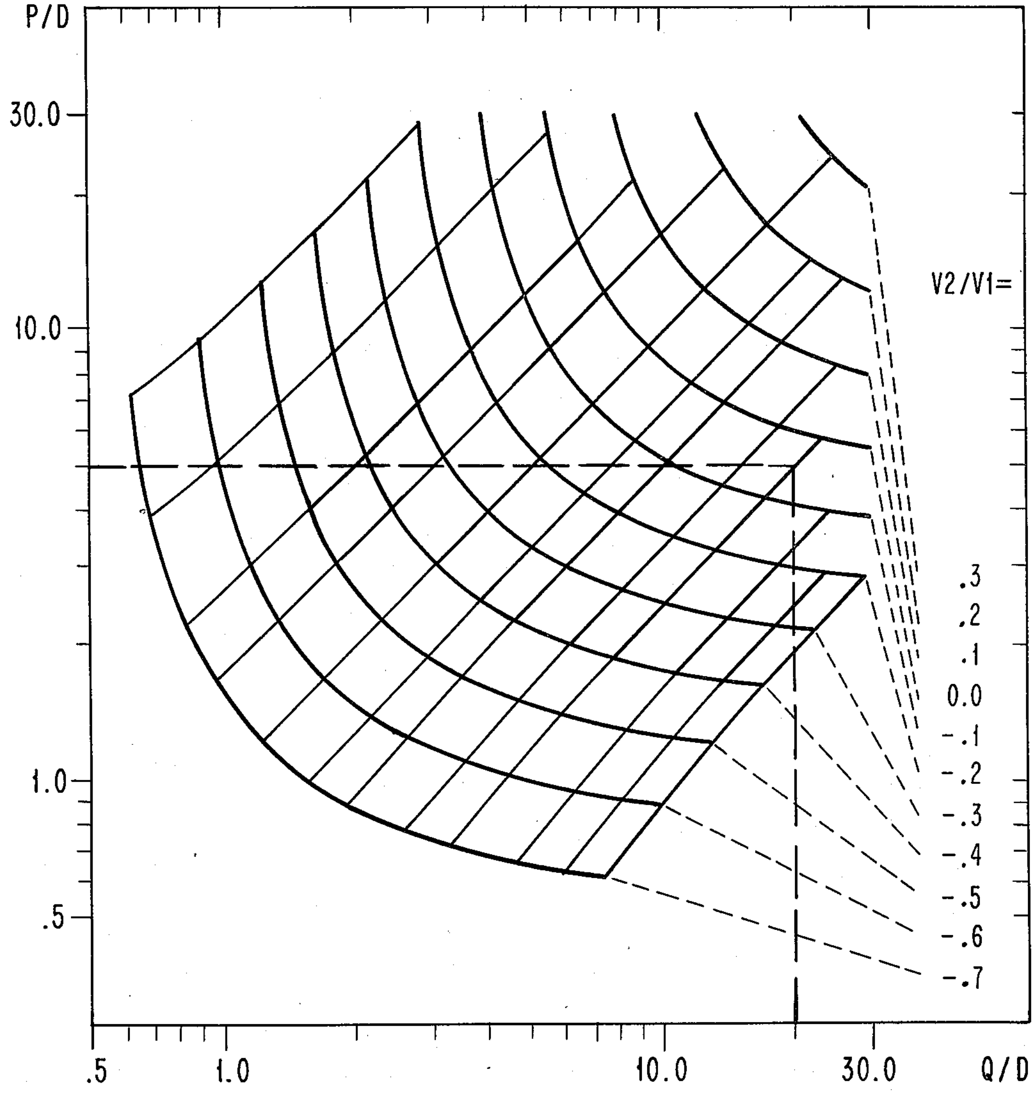
FIG. 3 is a chart showing the relationship of the three electrode lens of FIG. 2 with respect to its distances from the nozzle and the recording surface and the ratio of the potentials applied to the electrodes.

As an example, the magnitude of the charge on each of the droplets 20, which are to not be deflected from striking the predetermined position on the recording surface 23, is $10^{-12}$ coulomb, the mass of the droplet is $10^{-10}$ kgm., and the velocity is 400 inches per second. The distance from the nozzle 17 to the recording surface 23 is 0.5" with the central electrode 26 of the electrostatic lens 21 being disposed 0.1" from the nozzle 17. With the diameter of the aperture 28 of each of the electrodes 25–27 being 0.02", then a/D=5 and a'/D=20. With the spacing between the electrodes 25–27 being 0.01", the chart for such a three aperture electrode lens is found on page 175 of "Electrostatic Lens" and is shown in FIG. 3 hereof with magnification omitted. The chart discloses that $V_2$ should be slightly less than zero in order that there would be a negative ratio of $V_2$ to $V_1$ of a magnitude less than −0.1. This chart used P/D and Q/D but P is the same as a and Q is the same as a' since P represents the distance from the object to the lens and Q represents the distance from the lens to the image in the chart.

By slightly changing the positioning of the electrostatic lens 21 with respect to the nozzle 17 and the recording surface 23, the electrode 26 can be grounded rather than having a negative voltage slightly less than zero applied thereto when $V_1$ is positive and a positive voltage slightly greater than zero applied thereto when $V_1$ is negative.

While the present invention has shown and described the electrostatic lens 21 as comprising the three electrodes 25, 26, and 27, it should be understood that the electrostatic lens 21 could comprise only two aperture electrodes rather than three. However, this requires compensation for the acceleration produced by the two electrodes since the three electrodes 25–27 do not produce any acceleration of the droplet 20. With two of the electrodes, both have potentials of opposite polarity to the charge on the charged droplet 20 applied thereto with the furthest electrode from the nozzle 17 having the larger potential.

If desired, the electrodes 25–27 of the lens 21 or the electrostatic lens having two aperture electrodes could have the aperture with a shape other than circular. However, this would require compensation for deflection of the droplets 20 due to the forces acting thereon not being constant because of the aperture not being circular.

While the present invention has shown and described the stream 18 as being pressurized, it should be understood that the lens could have the droplets 20 pulled from the nozzle 17 by the potential on the electrode 25 with respect to the nozzle 17. However, this would require the stream 18 to be charged prior to exiting from the nozzle 17 whereby the charge electrode 19 would not be employed.

An advantage of this invention is that it prevents wandering of a stream of ink droplets. Another advantage of this invention is that it insures that a droplet strikes a selected position on a recording surface.

While the invention has been particularly shown and described with reference to a preferred embodiment thereof, it will be understood by those skilled in the art that various changes in form and details may be made therein without departing from the spirit and scope of the invention.

What is claimed is:

1. A method for compensating for instability of a stream of droplets including:

directing a pressurized liquid stream from a supply source toward a receiving means;

breaking up the stream into droplets spaced substantially uniform distances after the stream leaves the supply source;

charging at least some of the droplets to be charged;

electrostatically focusing each of the charged droplets after break up of the stream into droplets on a selected position of the receiving means to compensate for instability of the stream of droplets due to the stream of droplets failing to remain aligned while preventing any resultant change in velocity of the charged droplets due to electrostatically focusing each of the charged droplets;

electrostatically focusing each droplet by disposing at least two electrodes with apertures of substantially the same size so that at least each of the charged droplets passes through the apertures after formation, positioning the electrodes a distance no greater than one of the dimensions of the apertures from each other in the direction of the stream, and applying a substantially higher potential to at least one of the electrodes than to another of the electrodes to produce an electric field gradient therebetween sufficient to produce a radial force on each of the charged droplets, the substantially higher potential being substantially equal to the kinetic energy per unit charge of each of the charged droplets;

and charging the droplets to be charged after the droplets leave the supply source and prior to electrostatically focusing the droplets.

2. The method according to claim 1 including electrostatically focusing each droplet by disposing three electrodes with circular apertures of substantially the same diameter so that at least each of the charged droplets passes through the apertures after formation, positioning the electrodes the same distance from each other in the direction of the stream and a distance no greater than the diameter of the apertures from each other, applying the same and a substantially higher potential of a charge opposite to the charge on each of the charged droplets and substantially equal to the kinetic energy per unit charge of each of the charged droplets to each of the two outer electrodes than to the third of the electrodes to produce a first electric field gradient between one of the two outer electrodes and the third electrode and a second electric field gradient between the other of the two outer electrodes and the third electrode and opposite to the first electric field gradient with each of the electric field gradients producing a radial force on each of the charged droplets, and applying any deflection to the charged droplet after it has been electrostatically focused to deflect the charged droplet from the selected position on the receiving means.

3. The method according to claim 1 including electrostatically focusing each droplet by disposing at least two electrodes with circular apertures of substantially the same diameter so that at least each of the charged droplets passes through the apertures after formation, and positioning the electrodes a distance no greater than the diameter of the apertures from each other in the direction of the stream.

4. A method for compensating for instability of a stream of droplets including:

directing a liquid stream from a supply source toward a receiving means;

breaking up the stream into droplets spaced substantially uniform distances after the stream leaves the supply source;

causing at least some of the droplets to be charged;

electrostatically focusing each of the charged droplets after break up of the stream into droplets on a selected position of the receiving means to compensate for instability of the stream of droplets due to the stream of droplets failing to remain aligned while preventing any resultant change in velocity of the charged droplets due to electrostatically focusing each of the charged droplets;

and electrostatically focusing each droplet by disposing at least two electrodes with apertures of substantially the same size so that at least each of the charged droplets passes through the apertures after formation, positioning the electrodes a distance no greater than one of the dimensions of the apertures from each other in the direction of the stream, and applying a substantially higher potential to at least one of the electrodes than to another of the electrodes to produce an electric field gradient therebetween sufficient to produce a radial force on each of the charged droplets, the substantially higher potential being substantially equal to the kinetic energy per unit charge of each of the charged droplets.

5. The method according to claim 4 including electrostatically focusing each droplet by disposing three electrodes with circular apertures of substantially the same diameter so that at least each of the charged droplets passes through the apertures after formation, positioning the electrodes the same distance from each other in the direction of the stream and a distance no greater than the diameter of the apertures from each other, applying the same and a substantially higher potential of a charge opposite to the charge on each of the charged droplets and substantially equal to the kinetic energy per unit charge of each of the charged droplets to each of the two outer electrodes than to the third of the electrodes to produce a first electric field gradient between one of the two outer electrodes and the third electrode and a second electric field gradient between the other of the two outer electrodes and the third electrode and opposite to the first electric field gradient with each of the electric field gradients producing a radial force on each of the charged droplets, and applying any deflection to the charged droplet after it has been electrostatically focused to deflect the charged droplet from the selected position on the receiving means.

6. An apparatus for compensating for instability of a stream of droplets including:

means for supplying a pressurized liquid stream;

means to break up the stream into droplets spaced substantially uniform distances after the stream leaves said supply means;

charging means to cause at least some of the droplets to be charged;

means to receive at least the charged droplets;

compensating means disposed between said break-up means and said receiving means to electrostatically focus each of the charged droplets on a selected position of said receiving means to compensate for instability of the stream of droplets due to the stream of droplets failing to remain aligned;

said compensating means preventing any resultant change in velocity in the charged droplets due to electrostatic focusing of each of the charged droplets;

said compensating means including at least two electrodes;

each of said electrodes having an aperture of substantially the same size aligned with the exit of the stream from said supply means to have each of the charged droplets pass therethrough;

at least one of said electrodes having a substantially higher potential applied thereto than another of said electrodes;

said electrodes are spaced from each other in the direction of the stream a distance no greater than a dimension of said apertures;

the substantially higher potential being substantially equal to the kinetic energy per unit charge of each of the charged droplets;

and said charging means being disposed between said supply means and said compensating means to charge at least some of the droplets.

7. The apparatus according to claim 6 in which:

deflection means is disposed between said compensating means and said receiving means to selectively deflect each of the charged droplets;

said compensating means includes three electrodes spaced the same distance from each other in the direction of the stream;

said aperture in each of said electrodes is a circular aperture of substantially the same diameter aligned with the exit of the stream from said supply means to have each of the charged droplets pass therethrough;

each of two outer of said electrodes has the same potential of a charge opposite to the charge on each of the charged droplets applied thereto, the potential is substantially higher than the potential applied to the third of said electrodes;

and electrodes are spaced from each other in the direction of the stream a distance no greater than the diameter of said apertures.

8. The apparatus according to claim 7 in which said third electrode is grounded.

9. The apparatus according to claim 7 in which the ratio of the potential applied to said third electrode to the potential applied to each of said outer electrodes is in a range from less than +1 to less than −1.

10. The apparatus according to claim 6 in which:

said compensating means includes three electrodes spaced the same distance from each other in the direction of the stream;

said aperture in each of said electrodes is an aperture of substantially the same size aligned with the exit of the stream from said supply means to have each of the charged droplets pass therethrough;

each of two outer of said electrodes has the same potential of a charge opposite to the charge on each of the charged droplets applied thereto, the potential is substantially higher than the potential applied to the third of said electrodes;

and said electrodes are spaced from each other in the direction of the stream a distance no greater than a dimension of said apertures.

11. The apparatus according to claim 6 in which:

deflection means is disposed between said compensating means and said receiving means to selectively deflect;

said compensating means includes at least two electrodes;

said aperture in each of said electrodes is a circular aperture of substantially the same diameter aligned with the exit of the stream from said supply means to have each of the charged droplets pass therethrough;

and said electrodes are spaced from each other in the direction of the stream a distance no greater than the diameter of said apertures.

12. The apparatus according to claim 6 in which:

deflection means is disposed between said compensating means and said receiving means to selectively deflect each of the charged droplets.

13. The apparatus according to claim 6 in which:

deflection means is disposed between said compensating means and said receiving means to selectively deflect each of the charged droplets;

said compensating means includes three electrodes spaced the same distance from each other in the direction of the stream;

said aperture in each of said electrodes is an aperture of substantially the same size aligned with the exit of the stream from said supply means to have each of the charged droplets pass therethrough;

each of two outer of said electrodes has the same potential of a charge opposite to the charge on each of the charged droplets applied thereto, the potential is substantially higher than the potential applied to the third of said electrodes;

and said electrodes are spaced from each other in the direction of the stream a distance no greater than a dimension of said apertures.

14. The apparatus according to claim 6 in which:

said compensating means includes three electrodes spaced the same distance from each other in the direction of the stream;

said aperture in each of said electrodes is a circular aperture of substantially the same diameter aligned with the exit of the stream from said supply means to have each of the charged droplets pass therethrough;

each of two outer of said electrodes has the same potential of a charge opposite to the charge on each of the charged droplets applied thereto, the potential is substantially higher than the potential applied to the third of said electrodes;

and said electrodes are spaced from each other in the direction of the stream a distance no greater than the diameter of said apertures.

15. The apparatus according to claim 6 in which:

said compensating means includes at least two electrodes;

said aperture in each of said electrodes is a circular aperture of substantially the same diameter aligned with the exit of the stream from said supply means to have each of the charged droplets pass therethrough;

and said electrodes are spaced from each other in the direction of the stream a distance no greater than the diameter of said apertures.

16. An apparatus for compensating for instability of a stream of droplets including:

means for supplying a liquid stream;

means to break up the stream into droplets spaced substantially uniform distances after the stream leaves said supply means;

means to cause at least some of the droplets to be charged;

means to receive at least the charged droplets;

compensating means disposed between said break-up means and said receiving means to electrostatically focus each of the charged droplets on a selected position of said receiving means to compensate for instability of the stream of droplets due to the stream of droplets failing to remain aligned;

said compensating means preventing any resultant change in velocity of the charged droplets due to electrostatic focusing of each of the charged droplets;

said compensating means including at least two electrodes;

each of said electrodes having an aperture of substantially the same size aligned with the exit of the stream from said supply means to have each of the charged droplets pass therethrough;

at least one of said electrodes having a substantially higher potential applied thereto than to another of said electrodes;

said electrodes are spaced from each other in the direction of the stream a distance no greater than a dimension of said apertures;

and the substantially higher potential being substantially equal to the kinetic energy per unit charge of each of the charged droplets.

17. The apparatus according to claim 16 in which:

deflection means is disposed between said compensating means and said receiving means to selectively deflect each of the charged droplets;

said compensating means includes three electrodes spaced the same distance from each other in the direction of the stream;

said aperture in each of said electrodes is a circular aperture of substantially the same diameter aligned with the exit of the stream from said supply means to have each of the charged droplets pass therethrough;

each of two outer of said electrodes has the same potential of a charge opposite to the charge on each of the charged droplets applied thereto, the potential is substantially higher than the potential applied to the third of said electrodes;

and said electrodes are spaced from each other in the direction of the stream a distance no greater than the diameter of said apertures.

18. The apparatus according to claim 16 in which:

said compensating means includes three electrodes spaced the same distance from each other in the direction of the stream;

said aperture in each of said electrodes is an aperture of substantially the same size aligned with the exit of the stream from said supply means to have each of the charged droplets pass therethrough;

each of two outer of said electrodes has the same potential of a charge opposite to the charge on each of the charged droplets applied thereto, the potential is substantially higher than the potential applied to the third of said electrodes;

and said electrodes are spaced from each other in the direction of the stream a distance no greater than a dimension of said apertures.

* * * * *